A. G. & A. RONNING.
SILO FILLING FIXTURE.
APPLICATION FILED FEB. 24, 1914.

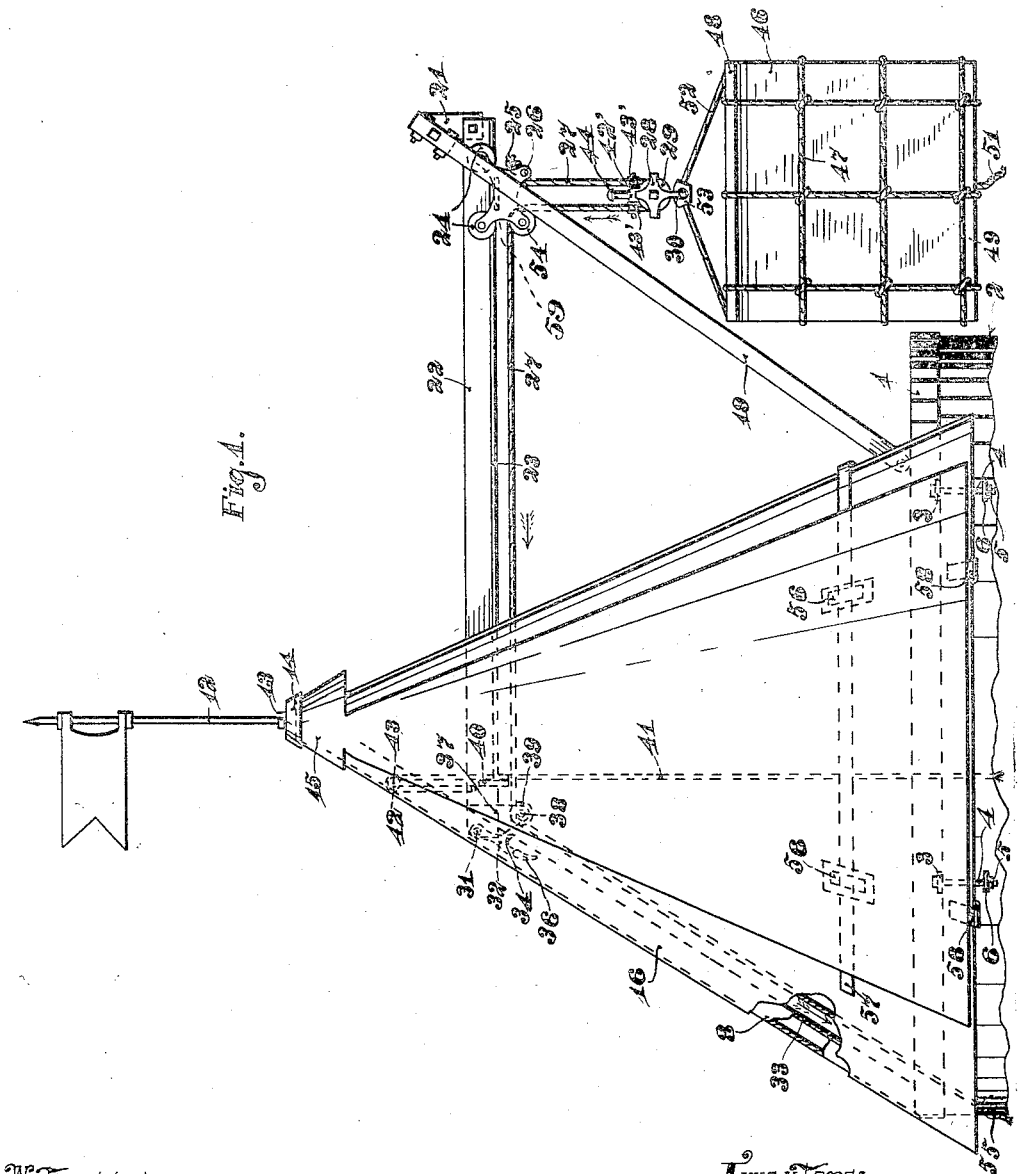

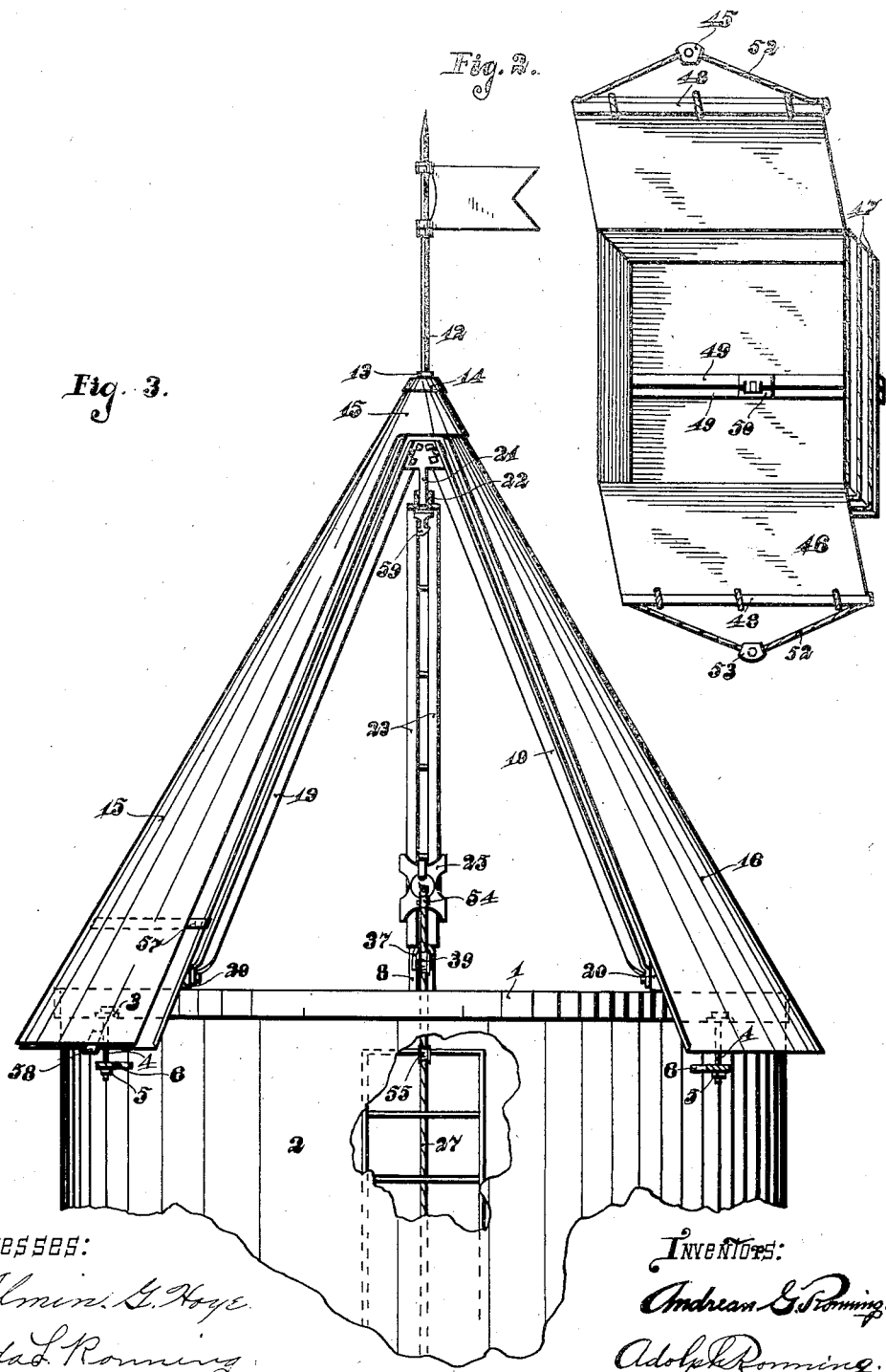

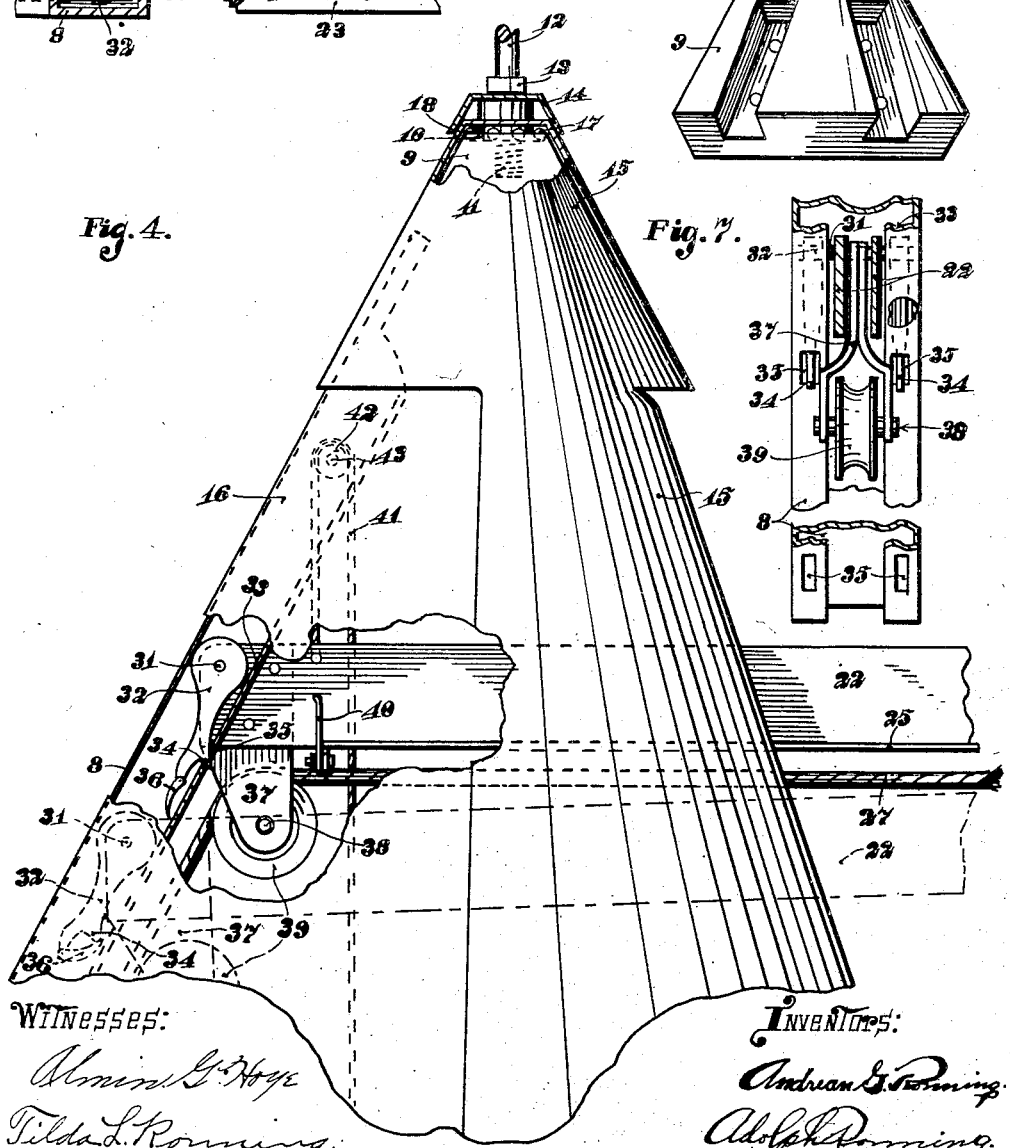

1,251,696.

Patented Jan. 1, 1918.
4 SHEETS—SHEET 4.

Witnesses:
Almin G. Hoye.
Tilda L. Ronning.

Inventors:
Andrew G. Ronning.
Adolph Ronning.

UNITED STATES PATENT OFFICE.

ANDREAN G. RONNING AND ADOLPH RONNING, OF BOYD, MINNESOTA, ASSIGNORS TO UNITED STATES ENSILAGE HARVESTER COMPANY, OF MINNEAPOLIS, MINNESOTA, A CORPORATION OF MINNESOTA.

SILO-FILLING FIXTURE.

1,251,696.        Specification of Letters Patent.        Patented Jan. 1, 1918.

Application filed February 24, 1914. Serial No. 820,696.

*To all whom it may concern:*

Be it known that we, ANDREAN G. RONNING, a citizen of the United States, residing at Boyd, in the county of Lac qui Parle and State of Minnesota, and ADOLPH RONNING, a citizen of the United States, residing at Boyd, in the county of Lac qui Parle and State of Minnesota, have invented new and useful Improvements in Silo-Filling Fixtures, of which the following is a specification.

Our invention has for its object to provide fixtures for silos of such a nature as to enable one to fill silos by means of ropes, slings and carrier, said fixtures being so constructed as to be readily adjusted to their working positions and which may be easily and compactly adjusted to a sheltered position when not in use.

In the accompanying drawings which illustrate the invention, like characters indicate like parts throughout the several views.

Referring to the drawings;

Figure 1 is a side elevation of the improved fixtures adjusted to their working positions, some parts being broken away;

Fig. 2 is a plan view of sling;

Fig. 3 is a front elevation of fixtures as adjusted to their position when not in use; some parts being broken away;

Fig. 4 is a fragmentary view in side elevation showing especially the inner end of the so-called carrier track when adjusted into position for service, some parts being broken away;

Fig. 5 is a fragmentary detail taken in section approximately on line $x^5$ $x^5$ on Fig. 4;

Fig. 6 is a detail in side elevation of vertex block, some parts thereof being broken away;

Fig. 7 is a detail, taken in vertical section showing the construction of the upper and lower ends of the rafter guide track;

The general construction of the fixtures will now be described.

Figure 9:
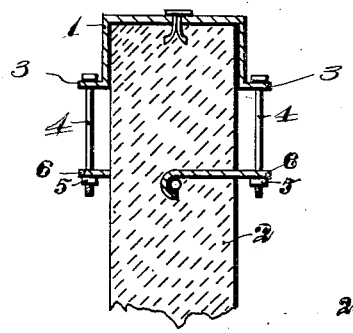
Fig. 9 is a detail in vertical section showing a manner of attaching the silo plate to the silo wall.
Figure 10:
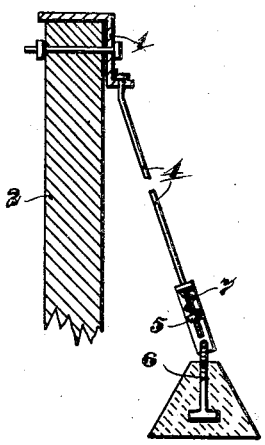
Fig. 10 is a detail in vertical section showing a modified way of attaching the silo plate to the silo wall.
Figure 8:
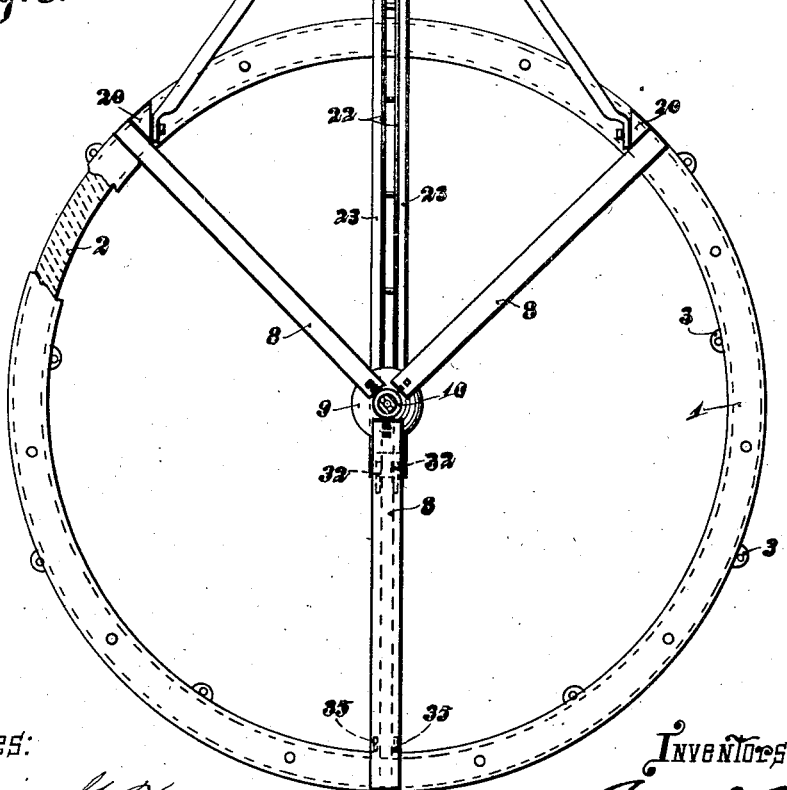
Fig. 8 is a plan view showing the silo plate, silo roof rafters and some of the hoisting mechanism as attached thereto, with some parts broken away.

Silo plate 1 is preferably formed from sheet metal in such a manner as to overlap and encircle the uppermost portion of the silo wall 2, and is provided with flanges 3 through which are inserted bolts or guide rods 4 which are provided at their lower ends with threading and threaded nuts 5. The silo may be provided with members 6 which are suitably inserted or built into the body of the silo wall and in such a manner as to project outside of the silo wall and so as to permit rods 4 to pass through them. See Figs. 1, 3, 8, 9 and 10. Rods 4 may be of any convenient length and construction and members 6 may be inserted in the upper or lower portion of the silo as desired.

A plurality of rafters 8 are suitably secured to the silo plate 1 at their lower ends and to a vertex block 9 at their upper ends. Vertex block 9 is provided with a ball bearing race 10 and a female threading 11 which is engaged by the male threading of the lower end of the shaft 12 and which is provided at its lower end with a flange 13. Shaft 12 passes through the center of cap 14 which overlaps and covers the upper portion of the roof sheeting 16. Cap 14 is attached to the roof door 15. Silo roof sheeting 16 is preferably made out of sheet metal and is secured by bolts or otherwise to the said rafters 8 and to silo plate 1. Ball race 10 is filled with ball bearings 17, which engage on their upper surfaces the under side of the race or inwardly curved portion 18 of the roof door 15.

Angle irons 19 are pivotally connected at their lower ends to the lower ends of rafters 8 which form a door frame for the silo roof. Angle irons 19 are secured at their upper ends to a block 21 which is pivotally secured at its lower end to a carrier track 22 which is provided at its lower side with flanges 23 which form a rail or track for wheels 24 of a carrier head 25 which is of well known and approved construction which is provided with a pin 26 to which is attached a rope 27 which runs in its lower loop through a sling block 28 which is of well known and approved construction and which is provided with pulley 29 and a hook 30. The inner end of the carrier track 22 is provided with a pin 31 which is loosely journaled at its ends in latch pieces 32 which move in a channel and track of the rear rafter 8 in a manner as best illustrated by Figs. 1, 4, 5 and 7, and which is provided with inwardly turned flanges 33.

Latch pieces 32 are provided at their lower ends with teeth 34 which engage the notches 35 which are cut in the flanges 33 near the ends of the said flanges 33. Latch pieces 32 are also pivotally attached at their lower ends to fingers 36 which are of sufficient length to fold over and cover said teeth 34 when doubled up in a manner as illustrated in broken lines in Fig. 4.

The inner end of the carrier track 22 is also provided with a block 37 which carries a pin 38 on which is journaled a pulley 39 over which runs the rope 27.

Strap springs 40 are inclined upward and are suitably secured at their lower ends to the carrier track 22 immediately in front of the block 37.

A rope 41 is secured to the inner end of the carrier track 22 and runs in its upward loop over a pulley 42 which is journaled on a pin 43 which is suitably secured in the sides of the rafter-track 8.

A sling block 42' is provided with rollers 43' and a tripping point 44 which is constructed in any well known and approved manner and in such a manner as to work in coöperation with the tripping mechanism of the said carrier head 25. Block 42' is also provided with a hook which is similar in construction to the hook 30 as illustrated in Fig. 1 and in such a manner as to be easily attached to the block 45 of the sling basket as illustrated in Fig. 2. The sling block mechanism just described is constructed in the same way as the sling blocks now ordinarily used in hoisting hay into barns and like the carrier head 25 it may be of any well known make of manufacture employed for similar purposes. The said sling is preferably made of canvas 46 which is reinforced by a network of rope 47 which is attached to members 48 and to members 49 which are locked together by means of a locking mechanism 50 which is constructed in any well known manner and which is provided with a check rope 51 which is employed by the operator for pulling and unlocking the said locking mechanism 50 as is ordinarily done for opening the bottom of the sling when this should be desired. Members 48 have ropes 52 attached to their ends. Block 45 is secured to the center of one of the said ropes 52 and the other rope 52 is provided at its center with a block 53.

Rope 27 as already noted is secured to pin 26 at one end and runs in its downward loop back and over pulleys 43' and down and over pulley 29 and runs in its upward loop over a pulley 54 which is suitably journaled in the carrier head 25. Rope 27 then runs on its inward loop over pulley 39, thence it runs approximately parallel to the rafter-track 8 and over a pulley 55 which is suitably journaled in a block which is conveniently secured by bolts or otherwise to the upper portion of the silo wall 2. A team of horses may be suitably hitched to the free end of said rope 27 and any suitable means for guiding and directing said rope 27 may be applied at any desirable point in any well known and approved manner. Any well known engine hoisting mechanism may of course be used instead of horses if this should be desired.

The lower end of the door 15 may be provided with rollers 56 so as to ride on a track 57 which is secured by rivets or otherwise to the silo roof sheeting 16. Rollers 56 are mounted in suitable bearings at each end, which are suitably attached to the under side of the said door 15, with freedom to clear under the door 15 and to travel on the said track 57. Door 15 may also be provided with strap hooks 58 at its lower end which curve under and back of the lower edge of the silo roof sheeting 16 so as to prevent the said door 15 from flopping in the wind.

The operation and function of the silo filling fixtures will then be as follows:

As the silo door 15 is opened, it will be carried by and turned on the ball bearings 17, and the rollers 56 will travel on the track 57. The rope 41 is then pulled by the operator and the inner end of the carrier track 22 with its attached flanges 32 will then ride up through the channel of the rafter-track 8 until latch teeth 34 drop into the notches 35. The raising of the inner end of the carrier track in this fashion will cause the angle irons 19 to swing outwardly at their upper ends until the carrier track 22 is approximately in a horizontal position. The sling which is now locked in the carrier head 25 is then pulled by means of check rope 51 until the carrier head 25 reaches the outer end of the carrier track 22, when the tripper 59 causes the carrier head 25 to automatically release block 42' with its attached tripping point 44 whereupon the blocks 28 and 42' with their attached sling may be lowered to the wagon below. The sling is then spread over the bottom of the box of the wagon. Each wagon is usually provided with two such slings and are filled as the wagons are drawn alongside and under the elevator of an ensilage harvester, a machine which cuts the standing stalks off the field, chops them into suitable lengths for ensilage and elevates the cut particles into the hopper or box of a wagon as already stated. When the load is thus filled it is drawn alongside the silo. Blocks 28 and 42 are then attached to their respective blocks 45 and 53 of the sling. The engine or horses which may be attached or hitched to the lower and free end of the rope 27 may then be started and the rope 27 will then move in the direction as indicated by arrows in Fig. 1, which will cause the blocks 28 and 42' to come together and to rise with their attached sling load of ensilage until the tripping point 44 releases the carrier head 25 from its lock hold on tripper block 59. When this is done, the carrier head 25 with its attached sling load of ensilage will then be drawn by the rope 27 on the carrier track 22 until the convenient point in the silo is reached, whereupon, the operator pulls the check rope 51 so as to unlock the lock mechanism 50 so as to open the bottom of the sling and thereby allow the ensilage in the sling to drop into the silo. By repeating these operations the silo may be easily filled and by dropping large quantities of ensilage in bunches in this way instead of sifting it in with an elevator or plower, and not allowing the air to retard the fall of each particle, the ensilage in the silo will be packed more. The periodic dropping of a thousand pounds of ensilage in this way will cause the entire body of ensilage to settle better.

It may also be well to observe that by pulling rope 41 until the fingers 36 drop into the upper notches 35 and then releasing the said rope 41, the fingers 36 will then double up so as to cover the teeth 34 in such a manner as to slide over the notches 35 and thus allow the inner end of the carrier track 22 to drop through the channel of the rafter track 8 in such a manner as to cause the angle irons 19 to be swung inwardly at their tops so as to fold up against the rafters 8 and thus allow the door 15 to slide over them and cover them as the said door 15 is closed.

Having thus described our invention, what we claim as new and desire to secure by Letters Patent is:

1. The following elements in combination, a silo plate, means for anchoring the said silo plate, a roof attached to the said silo plate, means for opening and closing a portion of the said roof, hoisting means attached to said silo plate and to said silo roof substantially as and for the purpose specified.

2. A silo plate, means for anchoring the said silo plate, a roof attached to said silo plate, means for opening and closing a portion of the said roof, hoisting means attached to said silo plate and to said roof, means for bringing the said hoisting means into a desirable position for service together with means for releasing the hoisted material from the said hoisting means so as to drop the same into the silo.

3. A silo plate, means for anchoring the said silo plate, a roof attached to said silo plate, means for opening and closing a portion of said silo roof, hoisting means attached to said silo plate and to said silo roof, means for telescoping the said hoisting means with the said silo roof, means for bringing the said hoisting means into position for service together with a second hoisting means for bringing the said first hoisting means into position for service.

4. A silo plate, means for anchoring said silo plate, a silo roof attached to said silo plate, means for opening and closing a portion of said roof, hoisting means pivotally attached to said silo roof and said silo plate, means for telescoping the said hoisting means into the said silo roof, a second hoisting means for bringing the said first hoisting means into a position for service, latch pieces pivotally attached to said first hoisting means together with carrying means incorporated in said first hoisting means substantially as and for the purposes specified.

ANDREAN G. RONNING.
ADOLPH RONNING.

Witnesses:
THEWALD BJOMLIE,
I. C. UNDLIN.